(12) United States Patent
Morita et al.

(10) Patent No.: US 12,083,894 B2
(45) Date of Patent: Sep. 10, 2024

(54) HYBRID DRIVE DEVICE

(71) Applicants: AISIN CORPORATION, Aichi (JP); TOYOTA JIDOSHA KABUSHIKI KAISHA, Toyota (JP)

(72) Inventors: Takeru Morita, Kariya (JP); Yuhi Hayakawa, Kariya (JP); Akinori Ozawa, Kariya (JP); Kenji Dozono, Kariya (JP); Masashi Ikemura, Toyota (JP)

(73) Assignees: AISIN CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 549 days.

(21) Appl. No.: 17/414,811

(22) PCT Filed: Jan. 8, 2020

(86) PCT No.: PCT/JP2020/000266
§ 371 (c)(1),
(2) Date: Jun. 16, 2021

(87) PCT Pub. No.: WO2020/145292
PCT Pub. Date: Jul. 16, 2020

(65) Prior Publication Data
US 2022/0016969 A1   Jan. 20, 2022

(30) Foreign Application Priority Data
Jan. 9, 2019 (JP) .................................. 2019-001798
Nov. 18, 2019 (JP) .................................. 2019-208200

(51) Int. Cl.
*B60K 6/26* (2007.10)
*B60K 6/387* (2007.10)
(Continued)

(52) U.S. Cl.
CPC ................ *B60K 6/405* (2013.01); *B60K 6/26* (2013.01); *B60K 6/387* (2013.01); *H02K 7/006* (2013.01); *H02K 7/083* (2013.01); *H02K 7/108* (2013.01)

(58) Field of Classification Search
CPC .......... B60K 6/26; H02K 7/006; H02K 7/083; H02K 7/108
See application file for complete search history.

(56) References Cited

U.S. PATENT DOCUMENTS 9,266,419 B2 * 2/2016 Iwase ..................... B60K 6/547
2013/0111891 A1 5/2013 Iwase et al.
(Continued)

FOREIGN PATENT DOCUMENTS

JP 2011-213189 A 10/2011
JP 2012-175889 A 9/2012
(Continued)

OTHER PUBLICATIONS

Mar. 24, 2020 International Search Report issued in International Patent Application No. PCT/JP2020/000266.

*Primary Examiner* — Erez Gurari
(74) *Attorney, Agent, or Firm* — Oliff PLC (57) ABSTRACT

A hybrid drive device including a rotary electric machine having a stator and a rotor, a transmission coupled to the rotary electric machine, a clutch that couples an engine and the rotary electric machine and that releases a connection of the two, and a case for housing the rotary electric machine and the clutch, the hybrid drive device including: a first transmitting shaft coupled to an output shaft of the engine; a second transmitting shaft that transmits power from the rotor of the rotary electric machine to the transmission; and a rotor support member that supports the rotor of the rotary electric machine.

18 Claims, 5 Drawing Sheets

(51) Int. Cl.
*B60K 6/405* (2007.10)
*H02K 7/00* (2006.01)
*H02K 7/08* (2006.01)
*H02K 7/108* (2006.01)

(56) References Cited

U.S. PATENT DOCUMENTS

| | | | |
|---|---|---|---|
| 2014/0230423 A1* | 8/2014 | Iwase | B60K 6/36 903/902 |
| 2014/0305389 A1 | 10/2014 | Iwase et al. | |
| 2014/0305721 A1 | 10/2014 | Iwase et al. | |
| 2014/0311425 A1 | 10/2014 | Iwase et al. | |
| 2014/0326105 A1* | 11/2014 | Kasuya | B60K 6/387 74/661 |
| 2015/0027273 A1* | 1/2015 | Iwase | B60K 6/48 74/665 B |
| 2017/0080793 A1* | 3/2017 | Suyama | B60K 6/54 |
| 2018/0003107 A1 | 1/2018 | Iwase et al. | |
| 2019/0145312 A1 | 5/2019 | Iwase et al. | |
| 2021/0086854 A1* | 3/2021 | Jung | H02K 15/00 |
| 2021/0107346 A1* | 4/2021 | Rößner | B60K 6/26 |
| 2021/0197657 A1* | 7/2021 | Nelson | F16H 57/0473 |
| 2021/0328479 A1* | 10/2021 | Großpietsch | H02K 1/30 |
| 2022/0016969 A1* | 1/2022 | Morita | H02K 7/006 |
| 2022/0055471 A1* | 2/2022 | Ideue | F16D 25/0638 |
| 2022/0097513 A1* | 3/2022 | Ota | F16D 33/18 |
| 2023/0150349 A1* | 5/2023 | Esaki | B60K 6/40 180/65.25 |
| 2023/0241959 A1* | 8/2023 | Riedisser | F16H 57/0452 180/65.21 |

FOREIGN PATENT DOCUMENTS

| | | |
|---|---|---|
| JP | 2013-095390 A | 5/2013 |
| JP | 2013-224082 A | 10/2013 |
| JP | 2014-33602 A | 2/2014 |
| JP | 2015-178862 A | 10/2015 |
| WO | 2017/170396 A1 | 10/2017 |

* cited by examiner

HYBRID DRIVE DEVICE

TECHNICAL FIELD

The present disclosure relates to a hybrid drive device including an engine, a rotary electric machine, a transmission coupled to the rotary electric machine, and a clutch that couples the engine and the rotary electric machine and that releases the connection of the two.

BACKGROUND ART

Conventionally, a hybrid drive device including a rotor support member that supports a rotor of a rotary electric machine and that is used as a clutch drum of a clutch is known (see Patent Document 1, for example). In this hybrid drive device, the rotor support member includes: a tubular rotor holding portion that holds a rotor core of the rotor on an outer peripheral side and in which a friction engagement plate of the clutch is fitted on an inner peripheral portion; a radial extension portion extended radially inward from the rotor holding portion; a tubular first axial protruding portion extending from an inner peripheral portion of the radial extension portion toward the transmission side and in the axial direction; and a tubular second axial protruding portion extending from the inner peripheral portion of the radial extension portion toward the engine side and in the axial direction. Further, an annular plate-shaped member is attached to the rotor holding portion so as to face the radial extension portion at a distance in the axial direction. The plate-shaped member includes a short cylindrical outer tubular portion and an inner tubular portion formed on the inner periphery. The outer tubular portion of the plate-shaped member is fitted in the rotor holding portion of the rotor support member, and is coupled to the rotor holding portion on the engine side, that is, on the opposite side of the rotor support member from the radial extension portion via splines, for example. Further, the first axial protruding portion of the rotor support member and the inner tubular portion of the plate-shaped member are each supported in the radial direction by a case of the rotary electric machine via a bearing. As a result, the rotor of the rotary electric machine is centered with respect to the axes of the input shaft and the intermediate shaft.

Conventionally, a hybrid drive device including a clutch having a clutch hub fixed to an input shaft driven by an engine, and a clutch drum that is fixed to an intermediate shaft coupled to a transmission and that is coupled to a rotor support member supporting a rotor of a rotary electric machine is also known (see Patent Document 2, for example). In this hybrid drive device, the rotor support member includes a tubular portion that supports a rotor core of the rotor, a flange portion that is extended radially outward from one end of the tubular portion, and a radial extension portion that is extended radially inward from the tubular portion. Further, the clutch drum of the clutch includes an outer tubular portion in which a friction engagement plate is fitted on an inner peripheral side, a flange portion that is extended radially outward from one end of the outer tubular portion, a radial extension portion that is extended radially inward from the outer tubular portion, and an inner tubular portion that is formed in an inner periphery of the radial extension portion and that is fixed to the intermediate shaft. A base end portion of the outer tubular portion of the clutch drum is fitted inside the tubular portion of the rotor support member, and the flange portion of the clutch drum is fastened to the flange portion of the rotor support member by bolts. The inner peripheral portion of the radial extension portion of the rotor support member and the inner tubular portion of the clutch drum are each supported in the radial direction by a case of the rotary electric machine via a bearing. As a result, the rotor of the rotary electric machine is centered with respect to the axes of the input shaft and the intermediate shaft.

RELATED ART DOCUMENTS

Patent Documents

Patent Document 1: Japanese Unexamined Patent Application Publication No. 2013-95390 (JP 2013-95390 A)
Patent Document 2: Japanese Unexamined Patent Application Publication No. 2012-175889 (JP 2012-175889 A)

SUMMARY OF THE DISCLOSURE

Problem to be Solved by the Disclosure

In the hybrid drive device described in the above Patent Document 1, a disposition space of the clutch, that is, the friction engagement plate is defined between the radial extension portion of the rotor support member and the plate-shaped member in the axial direction. Further, in the hybrid drive device described in the above Patent Document 2, a disposition space of the clutch, that is, the friction engagement plate is defined between the radial extension portion of the rotor support member and the radial extension portion of the clutch drum in the axial direction. However, in the hybrid drive device described in Patent Documents 1 and 2, since the clutch drum or the plate-shaped member is fitted in the tubular portion of the rotor support member or the rotor holding portion, although the rotor of the rotary electric machine can be aligned with respect to the shaft center of the hybrid drive device, the axial length of the disposition space of the clutch (friction engagement plate) becomes short. Thus, in the conventional hybrid drive device described above, there is a possibility that a torque capacity of the clutch cannot be sufficiently ensured Thus, the main object of the present disclosure is to sufficiently ensure a torque capacity of a clutch that couples an engine and a rotary electric machine while accurately aligning a rotor of the rotary electric machine of a hybrid drive device with respect to shaft centers of the engine and the transmission.

Means for Solving the Problem

The hybrid drive device of the present disclosure includes: a clutch that couples an engine and a rotary electric machine and that releases a connection between the two; a case that houses the rotary electric machine and the clutch; a first transmitting shaft coupled to an output shaft of the engine; a second transmitting shaft that transmits power from the rotor of the rotary electric machine to the transmission; and rotor support member that supports the rotor of the rotary electric machine, in which the rotor support member includes a tubular support portion in which the rotor is fixed to an outer peripheral portion and in which a friction engagement plate of the clutch is fitted in an inner peripheral portion, a flange portion that has an annular shape and that is extended radially outward from one end of the tubular support portion in an axial direction, an annular wall portion that is extended radially inward from the other end side of the tubular support portion in the axial direction, and an annular member that is coupled to the flange portion so as to face the annular wall portion at a distance in the axial direction and rotate integrally with the rotor, the annular wall portion and the annular member of the rotor support member are each supported in a radial direction by the case via a bearing, the annular member is coupled to the flange portion in a state of being in contact with an end surface on an opposite side of the flange portion from the rotor side, and the flange portion includes a protruding portion that protrudes in the axial direction from an outer peripheral portion of the end surface to an opposite side from the rotor side and that supports an outer peripheral surface of the annular member in the radial direction.

In the hybrid drive device of the present disclosure, the rotor support member that supports the rotor of the rotary electric machine is used as a clutch drum of the clutch, and includes the tubular support portion in which the rotor is fixed to the outer peripheral portion and in which the friction engagement plate of the clutch is fitted to the inner peripheral portion. Further, the rotor support member includes the flange portion that has an annular shape and that is extended radially outward from one end of the tubular support portion in the axial direction, the annular wall portion that is extended radially inward from the other end side of the tubular support portion in the axial direction, and the annular member that is coupled to the flange portion so as to face the annular wall portion at a distance in the axial direction and rotate integrally with the rotor. In addition the annular member is coupled to the flange portion in a state of being in contact with an end surface on an opposite side of the flange portion from the rotor side. Further, the flange portion includes the protruding portion that protrudes in the axial direction from the outer peripheral portion of the end surface, which is in contact with the annular member, to an opposite side from the rotor side, and that supports an outer peripheral surface of the annular member in the radial direction. The annular wall portion and the annular member of the rotor support member are each supported in the radial direction by the case via a bearing. As a result, the annular member can be accurately aligned with the shaft center of the engine and the transmission by the protruding portion of the flange portion and thus, the rotor of the rotary electric machine can be accurately aligned with the shaft center of the engine, and the like. Further, by bringing the annular member into contact with the end surface on the opposite side of the flange portion from the rotor side, the distance in the axial direction between the annular member and the annular wall portion, that is, a disposition space of the clutch can be sufficiently ensured, and the friction engagement plates of the number in accordance with a torque capacity required for the clutch can be disposed. As a result, in the hybrid drive device of the present disclosure, it is possible to sufficiently ensure the torque capacity of the clutch that couples the engine and the rotary electric machine while accurately aligning the rotor of the rotary electric machine with respect to the shaft centers of the engine and the transmission.

MODES FOR CARRYING OUT THE DISCLOSURE

Next, embodiments for carrying out the disclosure of the present disclosure will be described with reference to the drawings.

Figure 1:
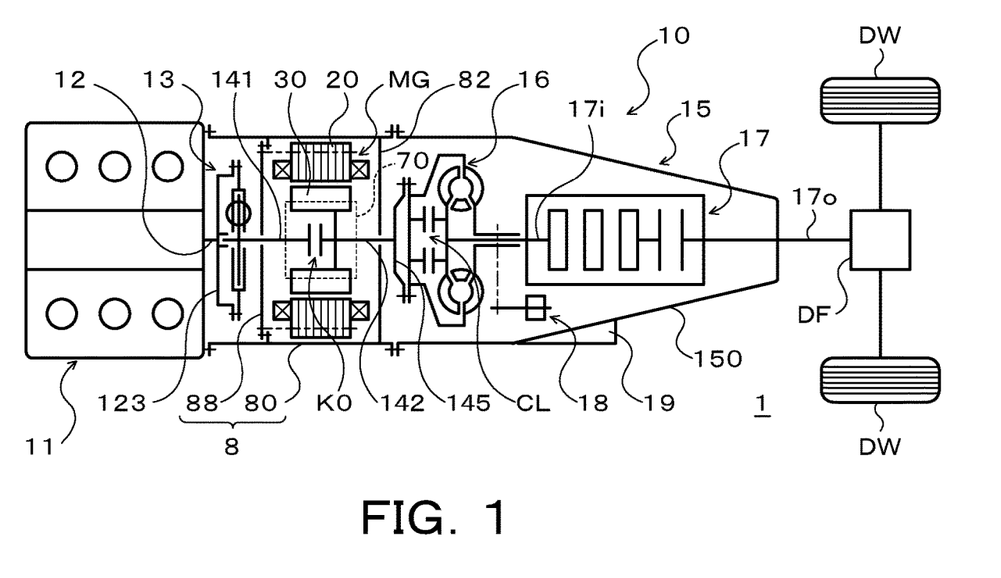
FIG. 1 is a schematic configuration diagram showing a hybrid drive device including a case of a rotary electric machine of the present disclosure.
Figure 2:
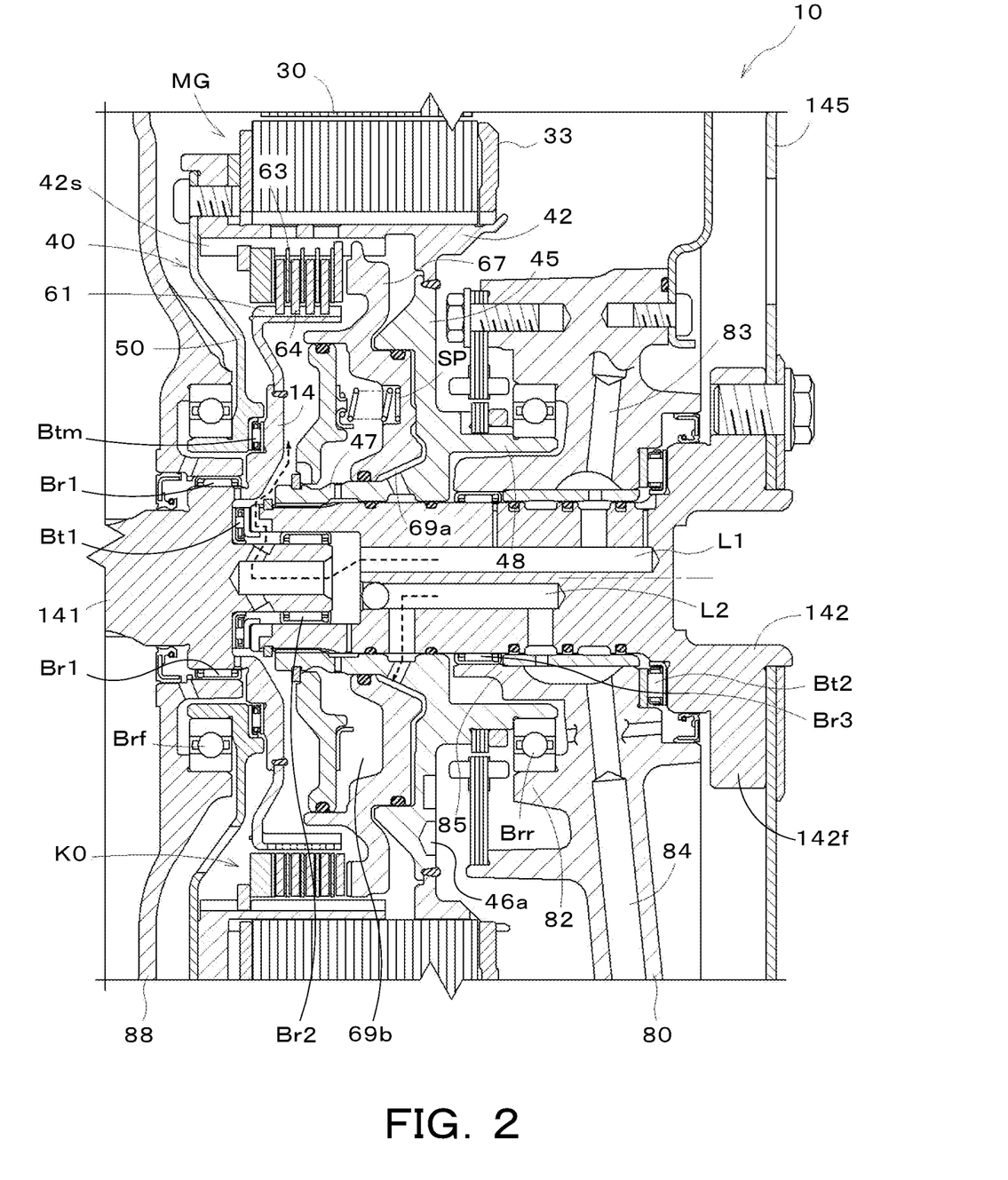
FIG. 2 is an enlarged view showing the hybrid drive device of the present disclosure.
Figure 3:
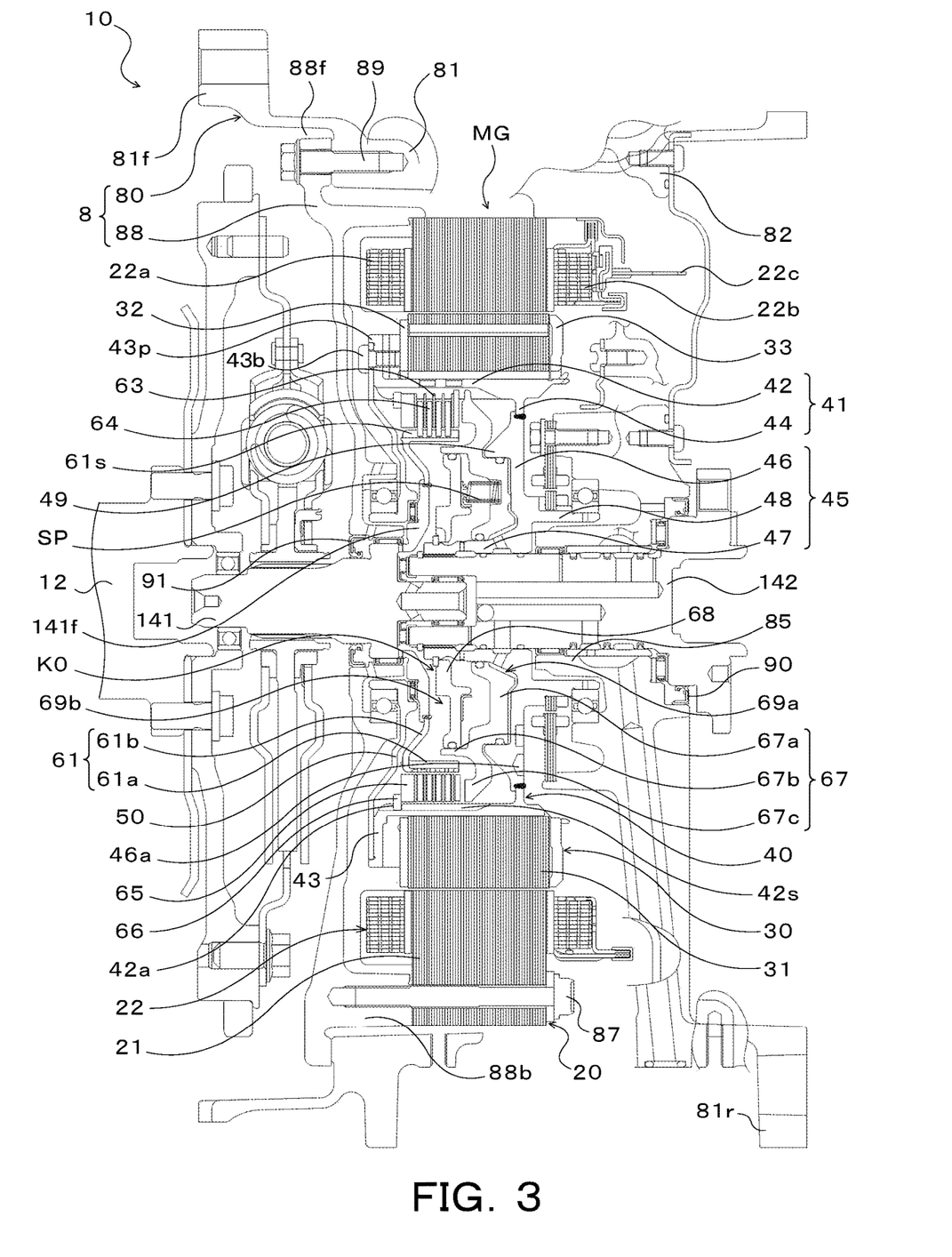
FIG. 3 is an enlarged view showing the hybrid drive device of the present disclosure.

FIG. 1 is a schematic configuration diagram showing a hybrid drive device 10 of the present disclosure. FIG. 2 and FIG. 3 are enlarged views showing the hybrid drive device 10. The hybrid drive device 10 is mounted on a vehicle 1 and generates a disturbance force for traveling, and as shown in FIG. 1, includes an engine 11, a motor generator (rotary electric machine) MG, a first transmitting shaft 141 coupled to the engine 11, a second transmitting shaft 142 to which power is transmitted from the motor generator MG, a clutch K0 that couples the first and second transmitting shafts 141, 142 and that releases the connection of the two, and a power transmitting device 15. The hybrid drive device 10 may be mounted on a rear-wheel drive vehicle as illustrated, may be mounted on a front-wheel drive vehicle, or may be mounted on a four-wheel drive vehicle including a transfer coupled to the power transmitting device 15.

The engine 11 is an internal combustion engine that converts a reciprocating motion of a piston (not shown) in accordance with the combustion of a mixture of hydrocarbon fuel such as gasoline or light oil and air into a rotational motion of a crankshaft (output shaft) 12. The crankshaft 12 of the engine 11 is coupled to the first transmitting shaft 141 via an annular coupling member 123 and a damper mechanism 13. For example, the damper mechanism 13 includes an input element coupled to the crankshaft 12 via the coupling member 123, an output element coupled to the first transmitting shaft 141, and a plurality of coil springs (elastic bodies) that transmits a torque between the input element and the output element and that dampens a torsional vibration.

The motor generator MG is a synchronous generator motor (three-phase alternating current motor), and transmits and receives electric power to and from a power storage device (battery, not shown) via an inverter that is not shown. The motor generator MG operates as an electric motor that is driven by electric power from the power storage device to generate a drive torque, and outputs a regenerative braking torque when the vehicle 1 is braked. The motor generator MG also operates as a generator that generates electric power by using at least a part of the power from the engine 11 that is operated under load.

As shown in FIGS. 1 to 3, the motor generator MG includes a stator 20 and a rotor 30 housed in a motor case 8. The motor case 8 includes a housing 80 having one end open and a cover 88 fixed to the housing 80 so as to cover the one end. The housing 80 of the motor case 8 is a generally bottomed tubular body in which one end in the axial direction, that is, an end portion on the engine 11 side is opened, and the other end in the axial direction, that is, an end portion on the power transmitting device 15 side is closed. In the present embodiment, the housing 80 is formed by casting an aluminum alloy, and includes a tubular outer shell portion 81 and an end wall (wall portion) 82 that closes the other end of the outer shell portion 81.

As shown in FIG. 3, a front side flange portion 81*f* having a plurality of bolt holes is formed on one end (front end) of the outer shell portion 81 of the housing 80, that is, on an outer periphery on an open end side. The front side flange portion 81*f* is fastened (fixed) to an engine block of the engine 11 via a plurality of bolts that is not shown and that is each inserted into a corresponding bolt hole. Further, the other end portion of the outer shell portion 81 protrudes from the end wall 82 toward the opposite side from the front side flange portion 81*f*, and a rear side flange portion 81*r* having a plurality of bolt holes is formed on an outer periphery of the other end (rear end) of the outer shell portion 81. The rear side flange portion 81*r* is fastened (fixed) to an end portion (front end) of a transmission case 150 (see FIG. 1) of the power transmitting device 15 via a plurality of bolts that is not shown and that is each inserted into the corresponding bolt hole.

Further, a tubular shaft support portion 85 having a through hole is provided in a center portion of the end wall 82 of the housing 80, and the second transmitting shaft 142 protrudes from the through hole of the tubular support portion 85 toward the power transmitting device 15 side. The shaft support portion 85 may be formed integrally with the end wall 82, or the shaft support portion 85 separate from the housing 80 may be fixed to the end wall 82. A flange portion 142*f* (see FIG. 2) is formed on an end portion of the second transmitting shaft 142 protruding from the end wall 82, and an inner peripheral portion of a flex plate 145 is fastened (fixed) to the flange portion 142*f* via a plurality of bolts not shown. Further, a seal member 90 is disposed in a clearance between the second transmitting shaft 142 and the shaft support portion 85.

The cover 88 of the motor case 8 is a disk-shaped member formed by casting an aluminum alloy. As shown in FIG. 3, the cover 88 includes a flange portion 88*f* having a plurality of bolt holes arranged at intervals along the outer periphery, a through hole through which the first transmitting shaft 141 is inserted, and a plurality of boss portions 88*b* each having a screw hole and that is formed at intervals in the circumferential direction. A seal member 91 is disposed in a clearance between the cover 88 and the first transmitting shaft 141 inserted through the through hole of the cover 88.

As shown in FIG. 3, the stator 20 includes an annular stator core 21 and a stator coil 22 wound around the stator core 21. The stator core 21 is integrally formed by stacking a plurality of electromagnetic steel plates formed in an annular shape by press working and coupling the plurality of electromagnetic steel plates in a stacking direction, for example. A plurality of bolt holes extending in the axial direction is formed in the stator core 21, and a bolt 87 is inserted into each bolt hole. Each bolt 87 is screwed into the screw hole of the corresponding boss portion 88*b* of the cover 88 and thus, the stator 20 is fixed to the cover 88.

The cover 88 to which the stator 20 is fixed is fixed to the housing 80 via a plurality of bolts 89 so that the stator 20 is surrounded by the outer shell portion 81 and a coil end 22*b* faces the end wall 82. As a result, the stator 20 is non-rotatably fixed to the motor case 8, and the cover 88 forms an end wall portion of the motor case 8 extending in the radial direction so as to face the motor generator MG and the clutch K0 on the engine 11 side. Further, in the present embodiment, as shown in FIG. 3, the cover 88 is fixed to the housing 80 so as to be close to the front side flange portion 81*f*, that is, a fastening portion (fixing portion) between the housing 80 and the engine block. This makes it possible to fix the cover 88 and the stator 20 to the engine block and the housing 80 more firmly.

The stator coil 22 includes three coils of a U phase, a V phase and a W phase, and includes a coil end 22*a* protruding from an end surface on the damper mechanism 13 side (left side in FIG. 3) in the axial direction of the stator core 21, and a coil end 22*b* protruding from an end surface on the power transmitting device 15 side (right side in FIG. 3). One end portion of the U phase, V phase, and W phase coils protrudes in the axial direction from the coil end 22*b* and is used as a terminal 22*c* of each phase. The terminal 22*c* of each phase is electrically coupled to an inverter (not shown) via a bus bar (not shown) of the V phase, the U phase, or the W phase corresponding to each terminal 22*c*.

As shown in FIG. 3, the rotor 30 includes a rotor core 31, end plates 32, 33 disposed on both sides of the rotor core 31 in the axial direction, and a rotor support member 40 for holding the rotor core 31 and the like. The rotor core 31 is formed by stacking a plurality of electromagnetic steel plates formed in an annular shape by press working, for example. Further, a plurality of through holes (not shown) each extending in the axial direction at intervals in the circumferential direction is formed in the rotor core 31, and a permanent magnet is embedded in each through hole.

The rotor support member 40 includes an annular outer side half portion 41, an annular inner side half portion 45 fixed to the outer side half portion 41, and an annular plate member (annular member) 50. Both the outer side half portion 41 and the inner side half portion 45 are formed by machining a forged body made of a steel material (made of an iron alloy), for example. The plate member 50 is also made of steel material. As shown in FIG. 3, the outer side half portion 41 includes a cylindrical outer tubular portion (tubular support portion) 42 in which the rotor core 31 is fixed to an outer peripheral portion, an annular flange portion 43 extended radially outward from one end (left end in FIG. 3) of the outer tubular portion 42 in the axial direction, and an annular radial protruding portion 44 protruding radially inward along the entire circumference from the other end side (right end in FIG. 3) of the center portion of the outer tubular portion 42 in the axial direction. The rotor core 31 is fixed to the outer tubular portion 42 of the rotor support member 40 by shrink fitting processing in a state in which the end plates 32, 33 are disposed on both sides in the axial direction. Further, the end plate 33 positioned on the opposite side of the flange portion 43 is fixed to the outer tubular portion 42 by swaging or the like. However, the rotor core 31 may be fixed to the outer tubular portion 42 by press fitting.

The inner side half portion 45 includes: an annular wall portion 46 extended in the radial direction; an inner tubular portion 47 that has a tubular shape and that is extended from an inner peripheral portion of the annular wall portion 46 to one side (left side in FIG. 3) in the axial direction; a cylindrical supported portion 48 extended from the annular wall portion 46 to the other side (right side in FIG. 3), on an outer radial side of the inner tubular portion 47; and a short tubular piston support portion 49 extended from the annular wall portion 46 to one side in the axial direction, on an outer radial side of the supported portion 48. In the present embodiment, on a surface on the opposite side of the annular wall portion 46 from the piston support portion 49, at least one recess portion 46*a* recessed to the piston support portion 49 side (one side) is formed so as to at least partially overlap with the piston support portion 49 when viewed in the axial direction of the rotor 30. The recess portion 46*a* is formed in the annular wall portion 46 in order to correct the imbalance of the entire rotor 30 after the rotor core 31 and the end plates 32, 33 are fixed to the rotor support member 40.

As shown in FIG. 3, an outer periphery of the annular wall portion 46 is fixed to an inner periphery of the radial protruding portion 44 of the outer side half portion 41 by welding. Further, an outer peripheral portion of the plate member 50 is fastened to the flange portion 43 of the rotor support member 40 (outer side half portion 41) by a plurality of bolts 43b so as to face the annular wall portion 46 at a distance in the axial direction. In the present embodiment, the plate member 50 is fixed to the flange portion 43 in a state in which a surface of the outer peripheral portion is in contact with an end surface (left side end surface in FIG. 3) on the opposite side of the flange portion 43 from the rotor 30 side. Further, an axial protruding portion 43p that has a short cylindrical (annular) shape is formed in the flange portion 43 so as to protrude in the axial direction from an outer peripheral portion of the end surface, with which the plate member 50 is in contact, to the opposite side (engine 11 side) from the rotor core 31 side. As a result, the outer peripheral surface of the plate member 50 is supported in the radial direction by the axial protruding portion 43p of the flange portion 43. A plurality of the axial protruding portions 43p may be formed on the outer peripheral portion of the end surface of the flange portion 43 at intervals in the circumferential direction.

Further, an outer peripheral surface of the supported portion 48 of the rotor support member 40 (inner side half portion 45) is supported in the radial direction and is supported so as to be rotatable by the motor case 8 via a radial bearing Brr (ball bearing in the present embodiment) held by the end wall 82 of the housing 80. The movement of the rotor support member 40 toward a speed change mechanism 17 side is restricted by the housing 80, that is, the case 8 via the radial bearing Brr. In contrast, the inner peripheral portion of the plate member 50 is supported in the radial direction and is supported so as to be rotatable by the cover 88 of the motor case 8 via a radial bearing Brf (an outer side radial bearing, in the present embodiment, a ball bearing). As a result, the rotor 30 is supported in the radial direction by the motor case 8 via the radial bearing Brf. Further, the inner tubular portion 47 of the rotor support member 40 includes a spline formed on an inner peripheral surface of a tip end portion (an end portion on the engine 11 side), and is always coupled (fixed) to the second transmitting shaft 142 via the spline.

The clutch K0 couples the first transmitting shaft 141, that is, the crankshaft 12 of the engine 11, and the second transmitting shaft 142, that is, the rotor 30 of the motor generator MG, and releases the connection of the two. In the present embodiment, the clutch K0 is a multi-plate friction type hydraulic clutch that uses the rotor support member 40 of the rotor 30 that is always coupled to the second transmitting shaft 142 as a clutch drum, and is disposed in the motor case 8, that is, on the inner radial side of the rotor 30. As shown in FIG. 3, in addition to the rotor support member 40 serving as a clutch drum, the clutch K0 includes a clutch hub 61 that is disposed between the annular wall portion 46 of the rotor support member 40 and the plate member 50 in the axial direction and that is always coupled (fixed) to the first transmitting shaft 141, a plurality of friction plates (second friction engagement plates) 63, a plurality of separator plates (first friction engagement plates) 64 and backing plates 65 that are alternately arranged with the friction plates 63, a snap ring 66, a piston 67, a plurality of return springs SP, and a cancel plate (cancel oil chamber defining member) 68.

As shown in FIG. 3, the clutch hub 61 includes a tubular portion 61a and an annular wall portion 61b extended radially inward from one end of the tubular portion 61a. Splines 61s are formed on an outer peripheral surface of the tubular portion 61a, and an inner periphery of the annular wall portion 61b is fixed to the first transmitting shaft 141. Further, splines 42s are formed on the inner peripheral surface of the outer tubular portion 42 of the rotor support member 40 serving as the clutch drum so as to be positioned closer to the flange portion 43 side than the radial protruding portion 44.

The friction plate 63 is an annular member to which a friction material is attached to both surfaces, and an outer peripheral portion of each friction plate 63 is fitted to the splines 42s (inner peripheral portion) of the outer tubular portion 42. Further, the backing plate 65 is fitted to the splines 42s of the outer tubular portion 42 so as to be able to come into contact with the friction plate 63 farthest from the piston 67 among the plurality of friction plates 63. The separator plate 64 is an annular member in which both surfaces are formed to be smooth, and an inner peripheral portion of each separator plate 64 is fitted to the splines 61s (outer peripheral portion) formed in the tubular portion 61a of the clutch hub 61.

Further, an annular recess portion 42a that is recessed radially outward is formed in the splines 42s of the outer tubular portion 42. The snap ring 66 is attached (fitted) to the annular recess portion 42a, and the movement of the backing plate 65, etc. in the axial direction (the movement in a direction away from the piston 67) is restricted by the snap ring 66. In the present embodiment, when viewed in the radial direction of the rotor 30, the annular recess portion 42a is formed in the splines 42s so as to overlap in the axial direction with a part of the flange portion 43 (including the annular plate disposed between the flange portion 43 and the end plate 32), more specifically, an end surface (an end surface in contact with the end plate 32) on the rotor 30 side of the flange portion 43.

That is, in the present embodiment, the flange portion 43 is extended radially outward from one end in the axial direction of the outer tubular portion 42 of the rotor support member 40, and the radial protruding portion 44 and the annular wall portion 46 are extended radially inward from the other end side of the center portion in the axial direction of the outer tubular portion 42. In such a configuration, when the rotor core 31 is fixed to the outer tubular portion 42 by shrink fitting processing or press fitting, according to the experiments and analysis by the present inventors, it was found that a relatively large stress acts on the outer tubular portion 42 from the rotor core 31 between the flange portion 43 and the radial protruding portion 44 in the axial direction. Thus, when the annular recess portion 42a is formed between the flange portion 43 of the outer tubular portion 42 and the radial protruding portion 44 in the axial direction, the stress from the rotor core 31 is concentrated in the annular recess portion 42a and there is a possibility that the durability of the outer tubular portion 42 as well as the rotor support member 40 as a whole is decreased. Based on this, in the present embodiment, the annular recess portion 42a is formed in the outer tubular portion 42 so as to overlap with a part of the flange portion 43 (the end surface on the rotor 30 side) in the axial direction when viewed in the radial direction of the rotor 30. As a result, it is possible to suppress the stress acting on the outer tubular portion 42 from the rotor core 31 from being concentrated in the annular recess portion 42a, and satisfactorily ensure the durability of the rotor support member 40.

Then, in the hybrid drive device 10, since the plate member 50 is coupled to the flange portion 43 in a state in which the plate member 50 is in contact with the end surface on the opposite side of the flange portion 43 from the rotor 30 side, the annular recess portion 42a can be formed in the outer tubular portion 42 so as to overlap with at least a part of the flange portion 43. In addition, when the plate member 50 is fastened to the flange portion 43 by the bolt 43b, since a thickness (axial length) of the flange portion 43 is ensured to some extent, it is possible to further improve the durability of the rotor support member 40 by making the end surface on the radial protruding portion 44 side of the annular recess portion 42a substantially flush with the end surface on the rotor 30 side of the flange portion 43, when viewed in the radial direction of the rotor 30.

The piston 67 includes an annular pressure receiving portion 67a, a tubular supported portion 67b extended from an outer periphery of the pressure receiving portion 67a to the clutch hub 61 side in the axial direction, and a pressing portion 67c formed radially outward of the supported portion 67b, and the piston 67 is disposed between the annular wall portion 46 of the rotor support member 40 and the plate member 50 in the axial direction. An inner peripheral surface of the pressure receiving portion 67a of the piston 67 is supported so as to be movable in the axial direction by an outer peripheral surface of the inner tubular portion 47 of the rotor support member 40 serving as a clutch drum via the seal member. Further, the outer peripheral surface of the pressure receiving portion 67a is movably supported in the axial direction by the inner peripheral surface of the piston support portion 49 of the rotor support member 40 via a seal member, and an engagement oil chamber 69a of the clutch K0 is defined between the annular wall portion 46 of the rotor support member 40 and the pressure receiving portion 67a of the piston 67. Further, a plurality of recess portions (grooves) loosely fitted in the splines 42s of the outer tubular portion 42 of the rotor support member 40 is formed in the outer peripheral portion of the pressing portion 67c at intervals in the circumferential direction. Thus, the piston 67 can be stopped from rotating with respect to the outer tubular portion 42, and the piston 67 and the outer tubular portion 42 can be rotated integrally.

The cancel plate 68 is an annular member disposed on an opposite side of the piston 67 from the annular wall portion 46 of the rotor support member 40. An inner peripheral portion of the cancel plate 68 is fixed to the inner tubular portion 47 of the rotor support member 40 by using a snap ring. Further, an outer peripheral surface of the cancel plate 68 movably supports an inner peripheral surface of the supported portion 67b of the piston 67 via a seal member, in the axial direction. As a result, a centrifugal hydraulic pressure cancel chamber 69b for canceling a centrifugal hydraulic pressure generated in the engagement oil chamber 69a is defined between the pressure receiving portion 67a of the piston 67 and the cancel plate 68. Further, the plurality of return springs (coil springs) SP is disposed at intervals in the circumferential direction between the pressure receiving portion 67a of the piston 67 and the cancel plate 68 in the axial direction. Each return spring SP urges the piston 67 to a side away from the friction plate 63 and the separator plate 64.

The power transmitting device 15 includes units such as a torque converter (fluid transmission device) 16 having a torque amplification function, a lockup clutch CL, the speed change mechanism (automatic transmission) 17, a mechanical oil pump 18, and a hydraulic control device 19 that adjust working oil pressure, the transmission case 150 that houses the speed change mechanism 17, etc. The torque converter 16 includes a front cover serving as an input member that is always coupled to the second transmitting shaft 142 via the flex plate 145 (see FIGS. 1 and 2), a pump impeller fixed to the front cover, and a turbine runner coupled to an input shaft 17i of the speed change mechanism 17, and a stator that rectifies the flow of the working oil from the turbine runner to the pump impeller so as to amplify the torque. However, the power transmitting device 15 may include a fluid coupling that has no stator, instead of the torque converter 16. The lockup clutch CL couples the front cover and the input shaft 17i of the speed change mechanism 17 and releases the connection of the two.

The speed change mechanism 17 is, for example, a 4-speed to 10-speed type multi-speed transmission including an output shaft 17o, a plurality of planetary gears, a plurality of clutches and a plurality of brakes (engagement elements for shifting), in addition to the input shaft 17i. The speed change mechanism 17 shifts a power transmitted from at least one of the engine 11 and the motor generator MG to the input shaft 17i via the second transmitting shaft 142 and either one of the torque converter 16 and the lockup clutch CL, in a plurality of stages, to output from the output shaft 17o to left and right drive wheels DW via a differential gear DF. However, the speed change mechanism 17 may be a dual clutch transmission or a mechanical continuously variable transmission. The torque converter 16 and the lockup clutch CL may be omitted from the power transmitting device 15. In this case, the speed change mechanism 17 may be coupled to the motor generator MG (the rotor support member 40 or the second transmitting shaft 142) via a clutch different from the clutch K0.

The oil pump 18 is a gear pump or a vane pump coupled to the pump impeller of the torque converter 16 via a winding transmitting mechanism, and is disposed on a shaft different from the input shaft 17i of the speed change mechanism 17. The oil pump 18 is driven by the power from the second transmitting shaft 142 via the winding transmitting mechanism, and sucks the working oil (ATF) stored in a working oil storage portion (not shown) to pressure-feed to the hydraulic control device 19. The hydraulic control device 19 includes a valve body in which a plurality of oil passages is formed, a plurality of regulator valves, a plurality of linear solenoid valves, and the like. The hydraulic control device 19 adjusts the hydraulic pressure (working oil) from the oil pump 18 and supplies the hydraulic pressure to the torque converter 16, the lockup clutch CL, the clutches and the brakes of the speed change mechanism 17. The transmission case 150 is a cast product made of an aluminum alloy.

In addition, the hybrid drive device 10 includes a second hydraulic control device 70 that supplies hydraulic pressure to the clutch K0. The hydraulic control device 70 is attached to a lower portion of the motor case 8 and adjusts the hydraulic pressure from the oil pump 18 to supply the hydraulic pressure to the engagement oil chamber 69a of the clutch K0 and the like. When the hydraulic pressure of the hydraulic control device 70 is supplied to the engagement oil chamber 69a via a radial oil passage 83 formed in the housing 80 (shaft support portion 85) of the motor case 8, an axial oil passage L1 and a radial oil passage L3 formed in the second transmitting shaft 142, and an oil hole 47a formed in the inner tubular portion 47 of the rotor support member 40, the piston 67 moves toward the cancel plate 68 by the action of an engagement hydraulic pressure. As a result, the separator plate 64 and the friction plate 63 are pressed by the pressing portion 67c and are frictionally engaged, and the clutch K0 is engaged. Further, the working oil drained from the hydraulic control device 70 is supplied to the centrifugal hydraulic pressure cancel chamber 69b of the clutch K0 via a radial oil passage 84 formed in the end wall 82 (shaft support portion 85), the axial oil passage L2 and a radial oil passage L4 formed in the second transmitting shaft 142, and the oil hole 47a formed in the inner tubular portion 47 of the rotor support member 40 so as to be side by side with an oil hole 47b in the axial direction. The hydraulic control device 70 may be omitted from the hybrid drive device 10, and in this case, the clutch K0 may be supplied with the hydraulic pressure from the hydraulic control device 19 of the power transmitting device 15. Further, the centrifugal hydraulic pressure cancel chamber 69b may be omitted from the clutch K0.

Subsequently, with reference to FIG. 4, support structures of the first and second transmitting shafts 141, 142 and the rotor support member 40 in the hybrid drive device 10, etc. will be described in detail.

Figure 4:
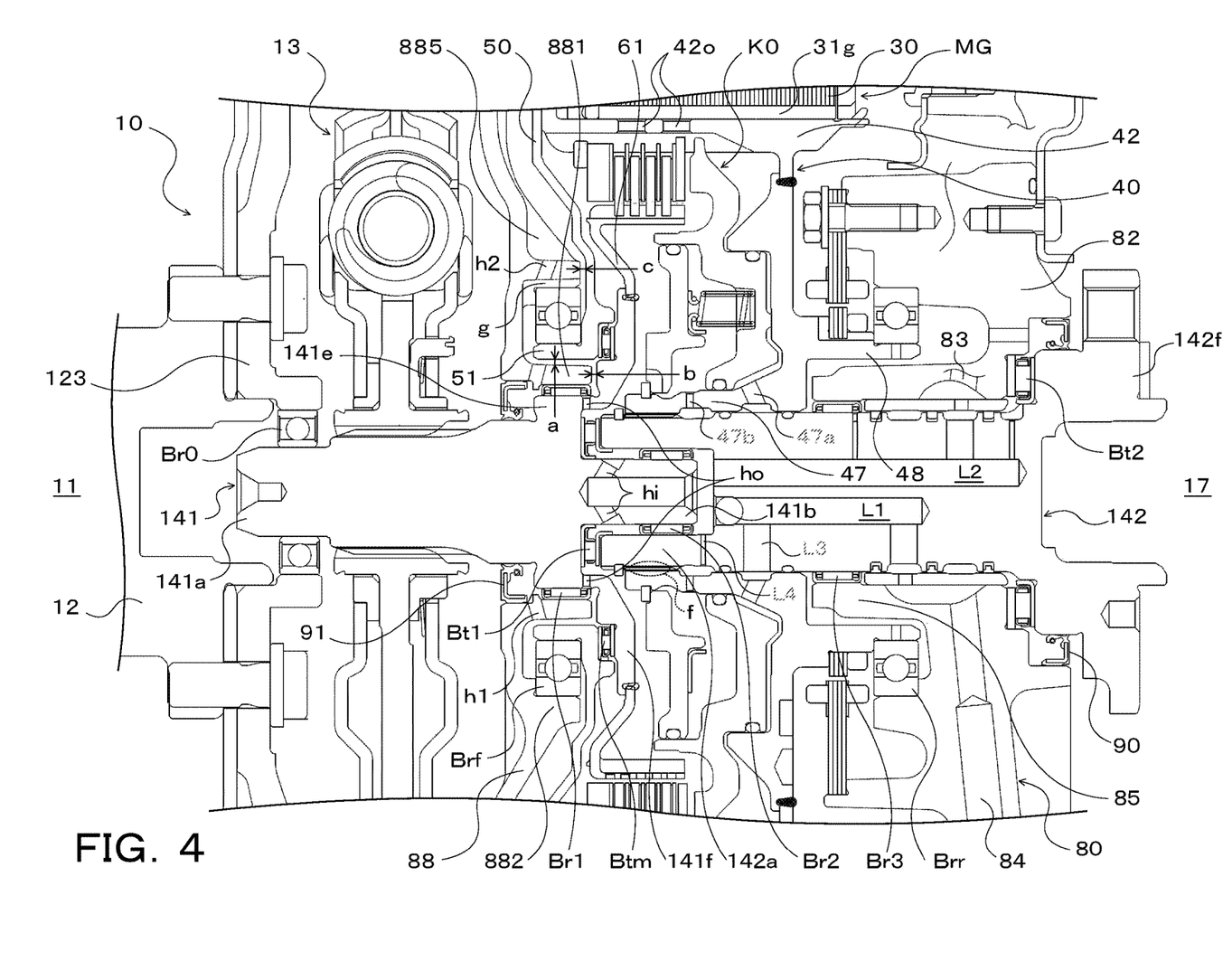
FIG. 4 is an enlarged view showing the hybrid drive device of the present disclosure.

As shown in FIG. 4, the first transmitting shaft 141 includes a first end portion 141a on the engine 11 side (left side in FIG. 4), a second end portion 141b on the speed change mechanism 17 side (right side in FIG. 4), and a disc-shaped expanded radius portion 141e formed between the first and second end portions 141a, 141b in the axial direction. The first end portion 141a has an outer peripheral surface having columnar surface shape, and the second end portion 141b is formed in a cylindrical shape (tubular shape) having a radius smaller than that of the first end portion 141a, as illustrated. The expanded radius portion 141e of the first transmitting shaft 141 is formed to have a larger radius than that of the first and second end portions 141a, 141b, and is adjacent to the second end portion 141b on the engine 11 side. That is, the second end portion 141b protrudes from an end surface of the expanded radius portion 141e on the speed change mechanism 17 side to the opposite side of the first end portion 141a.

Further, an annular flange portion 141f is extended from the expanded radius portion 141e of the first transmitting shaft 141. The flange portion 141f is extended radially outward and toward the speed change mechanism 17 side, from the outer peripheral portion of the expanded radius portion 141e so as to surround a part (about half of the expanded radius portion 141e side) of the second end portion 141b on the speed change mechanism 17 side of the plate member 50 of the rotor support member 40. In the present embodiment, an inner peripheral portion of a surface of the flange portion 141f on the speed change mechanism 17 side is formed in a conical surface shape so that a radius decreases from the speed change mechanism 17 side toward the engine 11 side. The inner periphery of the annular wall portion 61b of the clutch hub 61 is fixed to an outer peripheral portion of the flange portion 141f by welding. Further, a thrust bearing (outer side thrust bearing) Btm that supports the first transmitting shaft 141 in the axial direction is disposed between the flange portion 141f and the inner peripheral portion of the plate member 50 facing the flange portion 141f.

An end portion 142a of the second transmitting shaft 142 on the engine 11 side is formed in a cylindrical shape (tubular shape) having an outer radius smaller than an outer radius of the expanded radius portion 141e of the first transmitting shaft 141 and an inner radius larger than an outer radius of the second end portion 141b of the first transmitting shaft 141. An internal space of the end portion 142a communicates with an axial oil passage L2 of the second transmitting shaft 142. Further, splines into which the splines of the inner tubular portion 47 of the rotor support member 40 are fitted are formed on an outer peripheral surface of the end portion 142a.

The first end portion 141a of the first transmitting shaft 141 is supported in the radial direction by the crankshaft 12 of the engine 11 via the coupling member 123 that couples the crankshaft 12 and the damper mechanism 13, and a radial bearing Br0 (a fourth radial bearing, a ball bearing in the present embodiment). Further, the expanded radius portion 141e of the first transmitting shaft 141 is supported in the radial direction, between the first and second end portions 141a, 141b in the axial direction, by the cover 88 that is an end wall portion of the motor case 8 on the engine 11 side via a radial bearing Br1 (a first radial bearing or an inner side radial bearing). As shown in FIG. 4, the cover 88 includes a cylindrical first tubular portion 881 that protrudes from an inner periphery thereof toward the speed change mechanism 17 side so as to define a through hole through which the first transmitting shaft 141 is inserted. The radial bearing Br1 is disposed between an inner peripheral surface of the first tubular portion 881 and an outer peripheral surface of the expanded radius portion 141e of the first transmitting shaft 141 so as to be positioned on the speed change mechanism 17 side (right side in the figure) than the seal member 91 described above. In the present embodiment, the radial bearing Br1 is a cylindrical roller bearing including a cup that is press-fitted into the first tubular portion 881 of the cover 88.

The second end portion 141b of the first transmitting shaft 141 is inserted into the end portion 142a that is formed in a tubular shape and that is on the engine 11 side of the second transmitting shaft 142, and a radial bearing Br2 (a second radial bearing or an intermediate radial bearing) that supports the second transmitting shaft 142 in the radial direction is disposed between the outer peripheral surface of the second end portion 141b of the first transmitting shaft 141 and the inner peripheral surface of the end portion 142a of the second transmitting shaft 142 (therebetween in the radial direction). In the present embodiment, the radial bearing Br2 is a cylindrical roller bearing including a cup that is press-fitted into the end portion 142a of the second transmitting shaft 142. As can be seen from FIG. 4, when viewed in the radial direction, the radial bearing Br2 overlaps at least partially with the clutch hub 61 fixed to the outer peripheral portion of the flange portion 141f of the first transmitting shaft 141, in the axial direction.

Further, between the end surface on the engine 11 side of the second transmitting shaft 142, that is, an end surface of the end portion 142a and the end surface on the speed change mechanism 17 side of the expanded radius portion 141e in the axial direction, a thrust bearing (inner side thrust bearing) Bt1 that supports the first and second transmitting shafts 141, 142 in the axial direction is disposed. In the present embodiment, a thrust bearing that includes a single cage is adopted as the thrust bearing Bt1 in order to ensure oil permeability. As illustrated, a clearance is formed between an inner peripheral portion of the flange portion 141f of the first transmitting shaft 141 and the end portion 142a of the second transmitting shaft 142.

Further, as shown in FIG. 4, an internal space communicating with the axial oil passage L2 is defined between the end surface of the second end portion 141b of the first transmitting shaft 141 and an inner end surface in which the axial oil passage L2 in the end portion 142a of the second transmitting shaft 142 opens. Further, the first transmitting shaft 141 includes a plurality of inner side oil holes (first oil holes) hi formed in the second end portion 141b at intervals in the circumferential direction, and a plurality of outer side oil holes (second oil holes) ho each formed at intervals in the circumferential direction so as to pass through a vicinity of a base end portion of the flange portion 141f of the first transmitting shaft 141.

The plurality of inner side oil holes hi is each opened on an inner peripheral surface of the second end portion 141b, is opened between the radial bearing Br2 and the thrust bearing Bt1 on the outer peripheral surface of the second end portion 141b and the thrust bearing Bt1 in the axial direction, and forms an oil passage with an internal space that is opened at the end surface of the second end portion 141b. In the present embodiment, each inner side oil hole hi is formed obliquely so as to approach the engine 11 from the outer peripheral surface toward the inner peripheral surface of the second end portion 141b of the first transmitting shaft 141. This makes it possible to form the plurality of inner side oil holes hi each passing through the second end portion 141b without causing a drill bit to interfere with the flange portion 141f that surrounds a part of the second end portion 141b. A plurality of outer side oil holes o is formed so as to at least partially overlap with the radial bearing Br1 and the thrust bearing Bt1 in the axial direction when viewed in the radial direction, and is extended in the radial direction.

Then, the second transmitting shaft 142 is supported in the radial direction by the shaft support portion 85 that is provided in the housing 80 (end wall 82) of the motor case 8 on the speed change mechanism 17 side of the end portion 142a via a radial bearing (third radial bearing) Br3. In the present embodiment, the radial bearing Br3 is a cylindrical roller bearing including a cup that is press-fitted in the shaft support portion 85 of the housing 80. Further, a thrust bearing Bt2 that supports the second transmitting shaft 142 in the axial direction is disposed between the flange portion 142f of the second transmitting shaft 142 and the end wall 82 of the housing 80 in the axial direction. In the present embodiment, the thrust bearing Bt2 includes two cages.

The shaft support portion 85 of the housing 80 is formed in the end wall 82 so as to have an axial length of approximately half an axial length of a part (cylindrical part) of the second transmitting shaft 142 excluding the flange portion 142f. Further, the inner tubular portion 47 of the rotor support member 40 is fitted to the second transmitting shaft 142 so as to be positioned closer to the engine 11 than the shaft support portion 85. Further, splines on the inner peripheral surface of the inner tubular portion 47 are fitted to splines formed on the outer peripheral surface of the end portion 142a of the second transmitting shaft 142, and a snap ring that restricts the axial movement of the inner tubular portion 47, that is, the rotor support member 40 is attached to the end portion 142a. As a result, the rotor support member 40, that is, the rotor 30 of the motor generator MG is always coupled to the second transmitting shaft 142, and a fixing portion (spline fitting portion) f (see dotted line in FIG. 4) of the inner tubular portion 47, that is, the rotor support member 40 and the second transmitting shaft 142 is at least partially overlapped with the radial bearing Br2 in the axial direction when seen in the radial direction.

Further, as shown in FIG. 4, the cover 88 of the motor case 8 includes a cylindrical second tubular portion 882 protruding in the axial direction toward the speed change mechanism 17 so as to surround the first tubular portion 881. The second tubular portion 882 has an inner radius larger than an outer radius of the first tubular portion 881. Further, the plate member 50 of the rotor support member 40 includes a cylindrical tubular portion 51 that protrudes in the axial direction from the inner periphery thereof toward the engine 11. The tubular portion 51 of the plate member 50 has an inner radius larger than the outer radius of the first tubular portion 881 of the cover 88 and has an outer radius smaller than an inner radius of the second tubular portion 882.

An outer race of the radial bearing Brf (ball bearing) is press-fitted into the second tubular portion 882 so as not to come into contact with a surface (inner side surface) of the cover 88 on the speed change mechanism 17 side, and the tubular portion 51 of the plate member 50 is fitted in an inner race of the radial bearing Brf. As a result, the radial bearing Brf is disposed between an outer peripheral surface of the tubular portion 51 of the plate member 50 and an inner peripheral surface of the second tubular portion 882 of the cover 88, and the plate member 50 is supported by the cover 88 via the radial bearing Brf so as to be rotatable and is also supported in the radial direction. Further, since the outer race of the radial bearing Brf is press-fitted into the second tubular portion 882 and the tubular portion 51 is fitted into the inner race of the radial bearing Brf, the movement of the plate member 50, that is, the rotor support member 40 to the engine 11 side is restricted by the cover 88, that is, the case 8 via the radial bearing Brf.

Figure 5:
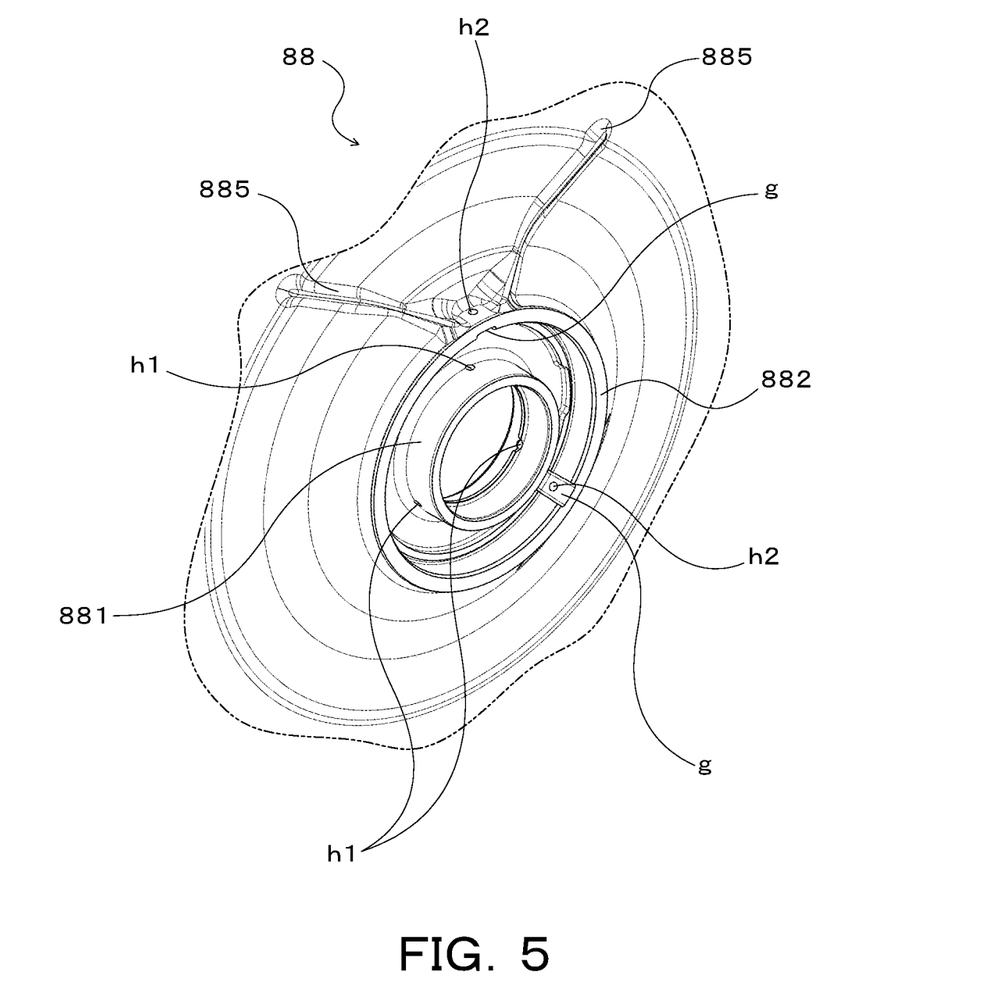
FIG. 5 is a perspective view showing a main part of a cover that configures the case of the rotary electric machine of the present disclosure.

As described above, the inner radius of the tubular portion 51 of the plate member 50 is larger than the outer radius of the first tubular portion 881 of the cover 88. Thus, as illustrated, an annular clearance a is formed between the outer peripheral surface of the first tubular portion 881 and the inner peripheral surface of the tubular portion 51 of the plate member 50. Further, as shown in FIGS. 4 and 5, a plurality of (for example, three in the present embodiment) oil holes h1 is formed in the first tubular portion 881 of the cover 88 at intervals in the circumferential direction. Each oil hole h1 is opened on the outer peripheral surface of the first tubular portion 881 and is opened on the inner peripheral surface of the first tubular portion 881 between the radial bearing Br1 and the seal member 91 in the axial direction. That is, each oil hole h1 communicates with a space in the axial direction between the clearance a, the radial bearing Br1, and the seal member 91.

Further, an end surface of the first tubular portion 881 of the cover 88 faces the flange portion 141f of the first transmitting shaft 141 at a distance, and an annular clearance b that communicates with the clearance a is formed between the end surface of the first tubular portion 881 and the flange portion 141f, as shown in FIG. 4. The above clearance b also communicates with an inner peripheral portion of the space in which the thrust bearing Btm is disposed. In contrast, the end surface of the second tubular portion 882 of the cover 88 faces the plate member 50 at a distance, and an annular clearance c is formed between the end surface of the second tubular portion 882 (and the end surfaces of the inner race and outer race of the radial bearing Brf) and the plate member 50.

Further, the second tubular portion 882 includes a plurality of (for example, two in the present embodiment) oil grooves g and a plurality of (for example, two in the present embodiment) oil holes h2. The plurality of oil grooves g is spaced at intervals in the circumferential direction on the inner peripheral surface of the second tubular portion 882 so that at least one oil groove g is positioned on an upper side in the motor case 8 and at least one oil groove g is positioned on a lower side in the motor case 8, and each communicates with the clearance c and a space defined between an inner side surface of the cover 88 and the radial bearing Brf. As shown in FIGS. 4 and 5, the plurality of oil holes h2 is formed so that at least one oil hole h2 is positioned on the upper side in the motor case 8 and at least one oil hole h2 is positioned on the lower side in the motor case 8, and each opens at the outer peripheral surface of the second tubular portion 882 and opens at a bottom surface (inner peripheral surface) of the corresponding oil groove g.

Further, as shown in FIGS. 4 and 5, the cover 88 includes a pair of oil collecting guides (protruding portions) 885 protruding from the inner side surface so as to be included in an upper side half region in the motor case 8. The pair of oil collecting guides 885 is formed on the inner side surface of the cover 88 so that the oil collecting guides 885 are separated from each other (are opened to the left and right) from the vicinity of an uppermost portion of the second tubular portion 882 in the motor case 8 toward an outer radial side. Further, as shown in FIG. 4, the base end portion of each oil collecting guide 885 protrudes to the vicinity of the end surface of the second tubular portion 882. Further, in the present embodiment, one oil hole h2 is disposed between the base end portions of the pair of oil collecting guides 885.

In the hybrid drive device 10 configured as described above, the first transmitting shaft 141 coupled to the crankshaft 12 of the engine 11 is supported in the radial direction by the cover 88 of the motor case 8 via the radial bearing (first radial bearing) Br1, between the first end portion 141a on the engine 11 side and the second end portion 141b on the speed change mechanism 17 side in the axial direction. The second end portion 141b of the first transmitting shaft 141 is inserted into the end portion 142a that is formed in a tubular shape and that is on the engine 11 side of the second transmitting shaft 142, and a radial bearing (a second radial bearing) Br2 that supports the second transmitting shaft 142 in the radial direction is disposed between the outer peripheral surface of the second end portion 141b of the first transmitting shaft 141 and the inner peripheral surface of the end portion 142a of the second transmitting shaft 142. Further, the second transmitting shaft 142 is supported in the radial direction by the shaft support portion 85 that is provided in the housing 80 of the motor case 8 on the speed change mechanism 17 side of the end portion 142a via a radial bearing (third radial bearing) Br3.

That is, the second transmitting shaft 142 is supported in the radial direction by the motor case 8 (cover 88) via the radial bearing Br2, the first transmitting shaft 141, and the radial bearing Br1 on the engine 11 side, and is supported in the radial direction by the shaft support portion 85 of the motor case 8 (housing 80) via the radial bearing Br3 on the speed change mechanism 17 side. As a result, it is possible to satisfactorily suppress the shaft runout of the second transmitting shaft 142 that transmits power from the rotor 30 of the motor generator MG to the speed change mechanism 17. Further, in the hybrid drive device 10, since it is not necessary to extend the shaft support portion 85 of the motor case 8 to the engine 11 side so as to support the radial bearing Br2, the shaft support portion 85 can be shortened, and another member, that is, the rotor support member 40 (inner tubular portion 47) can be disposed in the surplus space made as a result of the shaft support portion 85 being shortened. As a result, it is possible to shorten the axial length of the hybrid drive device 10 while suppressing a shaft runout of the second transmitting shaft 142.

Further, in the hybrid drive device 10, the inner tubular portion 47 of the rotor support member 40 is fitted to the second transmitting shaft 142 on the engine 11 side of the shaft support portion 85 of the motor case 8, and the fixing portion f of the inner tubular portion 47 (rotor support member 40) and the second transmitting shaft 142 is at least partially overlapped in the axial direction with the radial bearing Br2 when seen in the radial direction. As a result, the axial length of the hybrid drive device 10 can be further shortened by effectively utilizing the surplus space made by shortening the shaft support portion 85 of the motor case 8.

Further, the first end portion 141a of the first transmitting shaft 141 is supported in the radial direction by the coupling member 123 that couples the crankshaft 12 of the engine 11 and the damper mechanism 13 via the radial bearing (fourth radial bearing) Br0. The first transmitting shaft 141 includes the expanded radius portion 141e having a radius larger than that of the second end portion 141b adjacent to the second end portion 141b on the engine 11 side, and the expanded radius portion 141e is supported in the radial direction by the cover 88 of the motor case 8 via the radial bearing Br1. This makes it possible to support both the first and second transmitting shafts 141, 142 so that a shaft runout does not occur for the two.

Further, in the hybrid drive device 10, the annular flange portion 141f is extended radially outward from the expanded radius portion 141e of the first transmitting shaft 141 so as to surround at least a part of the second end portion 141b on the speed change mechanism 17 side. The clutch hub 61 of the clutch K0 is fixed to the outer peripheral portion of the flange portion 141f so as to at least partially overlap with the radial bearing Br2 in the axial direction when viewed in the radial direction. As a result, it is possible to connect the first transmitting shaft 141 and the clutch hub 61 of the clutch K0 while shortening the axial length of the hybrid drive device 10.

Further, the motor case 8 of the hybrid drive device 10 includes the cover 88 serving as the end wall portion extending so as to face the motor generator MG and the clutch K0 on the engine 11 side, and the rotor support member 40 includes the plate member (annular member) 50 that faces the cover 88. The cover 88 includes the first tubular portion 881 that protrudes in the axial direction from the inner periphery toward the speed change mechanism 17, and the second tubular portion 882 that protrudes in the axial direction toward the speed change mechanism 17 so as to surround the first tubular portion 881, and the plate member 50 of the rotor support member 40 includes the tubular portion 51 that protrudes in the axial direction from the inner periphery toward the engine 11. Further, the radial bearing (inner side radial bearing) Br1 for supporting the first transmitting shaft 141 in the radial direction is disposed between the first transmitting shaft 141 (expanded radius portion 141e) coupled to the crankshaft 12 of the engine 11 and the inner peripheral surface of the first tubular portion 881 of the cover 88, and the clearance a is formed between the outer peripheral surface of the first tubular portion 881 and the inner peripheral surface of the tubular portion 51 of the plate member 50. Moreover, the radial bearing (outer side radial bearing) Brf for supporting the rotor support member 40 in the radial direction is disposed between the outer peripheral surface of the tubular portion 51 of the plate member 50 and the inner peripheral surface of the second tubular portion 882 of the cover 88.

As a result, even if the cup of the radial bearing Br1 is press-fitted into the first tubular portion 881 of the cover 88 of the motor case 8 and the first tubular portion 881 is deformed, since the clearance a is formed between the outer peripheral surface of the first tubular portion 881 and the inner peripheral surface of the plate member 50 of the tubular portion 51, the deformation of the first tubular portion 881 does not affect the tubular portion 51 of the plate member 50. Even if deflection of the first transmitting shaft 141 with respect to the shaft center occurs in accordance with the rotation of the engine 11, since the clearance a is formed between the outer peripheral surface of the first tubular portion 881 and the inner peripheral surface of the tubular portion 51 of the plate member 50, the deflection of the first transmitting shaft 141 does not affect the tubular portion 51 of the plate member 50. Thus, in the hybrid drive device 10, the rotor support member 40 can be appropriately supported by the cover 88, that is, the case 8 via the radial bearing Brf, and the fluctuation of the clearance between the stator 20 and the rotor 30 can be satisfactorily suppressed.

Further, since the expanded radius portion 141e of the first transmitting shaft 141 is supported in the radial direction by the cover 88 of the motor case 8 via the radial bearing Br1, a torque fluctuation vibration (vibration) of the engine 11 transmitted to the first transmitting shaft 141 is no longer directly transmitted to the outer side radial bearing Brf. As a result, in the hybrid drive device 10, the load acting on the radial bearing Brf for supporting the rotor support member 40, that is, the rotor 30 of the motor generator MG so as to be rotatable and for also supporting the rotor support member 40 in the radial direction can be decreased, the durability thereof can be further improved, and the radial bearing Brf can be decreased in size (the cost can be decreased).

Further, the thrust bearing (inner side thrust bearing) Bt1 is disposed between the end surface on the speed change mechanism 17 side of the expanded radius portion 141e of the first transmitting shaft 141 and the end surface on the engine 11 side of the second transmitting shaft 142. Moreover, the flange portion 141f extended from the expanded radius portion 141e of the first transmitting shaft 141 faces the end surface of the first tubular portion 881 of the cover 88 and the plate member 50 on the speed change mechanism 17 side, and the thrust bearing (outer side thrust bearing) Btm is disposed between the flange portion 141f and the inner peripheral portion (a back surface of the tubular portion 51) of the plate member 50. Further, the first transmitting shaft 141 includes the plurality of inner side oil holes (first oil holes) hi each opened on the outer peripheral surface of the second end portion 141b between the radial bearing Br2 and the thrust bearing Bt1 in the axial direction and on the inner peripheral surface of the second end portion 141b.

Further, the first transmitting shaft 141 includes the plurality of outer side oil holes ho that at least partially overlaps with the radial bearing Br1 and the thrust bearing Bt1 in the axial direction when viewed in the radial direction. The cover 88 includes the plurality of oil holes h1 each opened on the outer peripheral surface of the first tubular portion 881 and opened on the inner peripheral surface of the first tubular portion 881 between the radial bearing Br1 and the seal member 91 in the axial direction. Further, the annular clearance b communicating with the clearance a is formed between the end surface of the first tubular portion 881 and the flange portion 141f, and the annular clearance c is formed between the end surface of the second tubular portion 882 and the plate member 50. In addition, the second tubular portion 882 includes the plurality of oil grooves g and the plurality of oil holes (second oil holes) h2 as described above.

As a result, the working oil serving as a lubricating cooling medium supplied from the axial oil passage L2 of the second transmitting shaft 142 into the second end portion 141b of the first transmitting shaft 141 can be supplied from the plurality of inner side oil holes hi to the radial bearing (intermediate radial bearing) Br2 and the thrust bearing Bt1, and can be supplied to the clutch K0 (the friction plate 63, the separator plate 64, etc.) on the outer radial side via the thrust bearing Bt1. Further, the working oil serving as the lubricating cooling medium supplied to the clutch K0 side can be supplied to the rotor core 31 and the coil ends 22a, 22b of the stator 20 via a plurality of oil holes 42o formed in the outer tubular portion 42 of the rotor support member 40, a plurality of oil grooves 31g formed in the rotor core 31, and the like.

Further, a part of the oil scattered from the inner side oil hole hi toward the rotor 30 side of the motor generator MG, that is, the coil end 22a side of the stator 20, travels along the inner side surface of the cover 88 and flows into the clearance c and the oil holes h2 of the second tubular portion 882. Thus, in the hybrid drive device 10, a part of the working oil that has flowed out from the inner side oil holes hi to the rotor 30 side can be supplied to the radial bearing Brf. As a result, the radial bearing Br2, the thrust bearing Bt1, and the radial bearing Brf can be sufficiently lubricated and cooled, and the durability of each bearing can be satisfactorily ensured. In addition, on the inner side surface of the cover 88, the pair of oil collecting guides 885 is formed so as to collect the oil scattered from above and guide the oil to the clearance c between the end surface of the second tubular portion 882 and the plate member 50 and to the oil holes h2 of the second tubular portion 882. Thus, the amount of oil that is scattered from the inner side oil holes hi of the first transmitting shaft 141 to the rotor 30 side and that flows into the clearance c between the end surface of the second tubular portion 882 and the plate member 50 can be increased, and a sufficient amount of oil can be supplied to the radial bearing Brf. However, the oil holes h2 may be omitted from the second tubular portion 882.

Moreover, in the hybrid drive device 10, the working oil that has passed through the thrust bearing Bt1 can supplied from the plurality of outer side oil holes ho of the first transmitting shaft 141 to the radial bearing Br1, and a part of the oil that has flowed into the outer side oil holes ho can be supplied to the thrust bearing Btm via the clearance b between the end surface of the first tubular portion 881 and the flange portion 141f of the first transmitting shaft 141. A part of the oil that has flowed into the outer oil holes ho is also supplied to the radial bearing Brf via the clearance a between the outer peripheral surface of the first tubular portion 881 and the inner peripheral surface of the tubular portion 51 of the plate member 50. Further, the working oil moves from the upper side to the lower side via the oil holes h1 of the first tubular portion 881 (cover 88). As a result, the radial bearings Br1, Brf and the thrust bearing Btm can be sufficiently lubricated and cooled, and the durability of each bearing can be satisfactorily ensured.

Further, in the hybrid drive device 10, the plurality of inner side oil holes hi of the first transmitting shaft 141 is formed obliquely so as to approach the engine 11 from the outer peripheral surface toward the inner peripheral surface of the second end portion 141b. As a result, the flange portion 141f of the first transmitting shaft 141 can be formed so as to surround a part of the second end portion 141b in order to shorten the axial length of the hybrid drive device 10, the first transmitting shaft 141 and the clutch hub 61 of the clutch K0 can be connected, and the inner side and the outer side of the second end portion 141b can be communicated via the plurality of inner side oil holes hi.

Further, in the hybrid drive device 10, the rotor support member 40 incudes the annular wall portion 46 that is supported in the radial direction by the motor case 8 (housing 80) via the radial bearing Brr, and the plate member 50 that is supported in the radial direction by the motor case 8 (cover 88) via the radial bearing Brr. Further, the plate member 50 is coupled to the annular flange portion 43 extended radially outward from one end of the outer tubular portion 42 of the rotor support member 40 in the axial direction so that the plate member 50 rotates integrally with the rotor 30, and the plate member 50 faces the annular wall portion 46 at a distance in the axial direction. Further, the plate member 50 is coupled to the flange portion 43 in a state of being in contact with the end surface on the opposite side of the flange portion 43 from the rotor core 31 side, and the flange portion 43 includes the axial protruding portion 43p that protrudes in the axial direction from the outer peripheral portion of the end surface in which the plate member 50 is in contact with to the opposite side of the rotor core 31 side and that supports the outer peripheral surface of the plate member 50 in the radial direction.

As a result, the plate member 50 is accurately aligned with the shaft center of the engine 11 and the speed change mechanism 17 by the axial protruding portion 43p of the flange portion 43 and thus, can be accurately aligned with the shaft center of the engine 11 of the rotor 30 of the motor generator MG. Further, by bringing the plate member 50 into contact with the end surface on the opposite side of the flange portion 43 from the rotor side, the distance in the axial direction between the plate member 50 and the annular wall portion 46, that is, a disposition space of the clutch K0 can be sufficiently ensured, and the friction plates 63 and the separator plates 64 of the number in accordance with a torque capacity required for the clutch K0 can be disposed. As a result, in the hybrid drive device 10, it is possible to sufficiently ensure the torque capacity of the clutch K0 while accurately aligning the rotor 30 of the motor generator MG with respect to the shaft centers of the engine 11 and the speed change mechanism 17.

Further, the clutch K0 includes the piston 67 that is disposed between the annular wall portion 46 (and the radial protruding portion 44) and the plate member 50 in the axial direction, and the engagement oil chamber 69a of the clutch K0 is defined by the piston 67 and the annular wall portion 46 of the rotor support member 40. As a result, since a torque transmitting function and a pressure receiving function when engaging the clutch K0 are gathered on the outer tubular portion 42 and the annular wall portion 46 sides, the rigidity required for the plate member 50 can be reduced so as to reduce the cost. Further, the plate member 50 of the rotor support member 40 does not transmit torque when the clutch K0 is engaged. Thus, the plate member 50 does not need to be coupled to the flange portion 43 via splines, etc., and may be coupled to the flange portion 43 by a relatively small number of bolts 43b so that the plate member 50 rotates integrally with the rotor 30.

As described above, a hybrid drive device of the present disclosure includes an engine (11), a rotary electric machine (MG) having a stator (20) and a rotor (30), a transmission (17) coupled to the rotary electric machine (MG), a clutch (K0) that couples the engine (11) and the rotary electric machine (MG) and that releases a connection of the two, and a case (8) for housing the rotary electric machine (MG) and the clutch (K0), the hybrid drive device (10) including: a first transmitting shaft (141) coupled to an output shaft (12) of the engine (11); a second transmitting shaft (142) that is coupled to the rotor (30) of the rotary electric machine (MG) and the transmission (17); and rotor support member (40) that supports the rotor (30) of the rotary electric machine (MG), the rotor support member (40) includes a tubular support portion (42) in which the rotor (30) is fixed to an outer peripheral portion and in which a friction engagement plate (63) of the clutch (K0) is fitted in an inner peripheral portion, a flange portion (43) that has an annular shape and that is extended radially outward from one end of the tubular support portion (42) in an axial direction, an annular wall portion (44, 46) that is extended radially inward from the other end side of the tubular support portion (42) in the axial direction, and an annular member (50) that is coupled to the flange portion (43) so as to face the annular wall portion (44, 46) at a distance in the axial direction and rotate integrally with the rotor (30), the annular wall portion (44, 46) and the annular member (50) of the rotor support member (40) are each supported in a radial direction by the case (8) via a bearing (Brr, Brf), the annular member (50) is coupled to the flange portion (43) in a state of being in contact with an end surface on an opposite side of the flange portion (43) from the rotor (30) side, and the flange portion (43) includes a protruding portion (43p) that protrudes in the axial direction from an outer peripheral portion of the end surface to an opposite side from the rotor (30) side and that supports an outer peripheral surface of the annular member (50) in the radial direction.

In the hybrid drive device of the present disclosure, the rotor support member that supports the rotor of the rotary electric machine is used as a clutch drum of the clutch, and includes the tubular support portion in which the rotor is fixed to the outer peripheral portion and in which the friction engagement plate of the clutch is fitted to the inner peripheral portion. Further, the rotor support member includes the flange portion that has an annular shape and that is extended radially outward from one end of the tubular support portion in the axial direction, the annular wall portion that is extended radially inward from the other end side of the tubular support portion in the axial direction, and the annular member that is coupled to the flange portion so as to face the annular wall portion at a distance in the axial direction and rotate integrally with the rotor. In addition the annular member is coupled to the flange portion in a state of being in contact with an end surface on an opposite side of the flange portion from the rotor side. Further, the flange portion includes the protruding portion that protrudes in the axial direction from the outer peripheral portion of the end surface, which is in contact with the annular member, to an opposite side from the rotor side, and that supports an outer peripheral surface of the annular member in the radial direction. The annular wall portion and the annular member of the rotor support member are each supported in the radial direction by the case via a bearing. As a result, the annular member can be accurately aligned with the shaft center of the engine and the transmission by the protruding portion of the flange portion and thus, the rotor of the rotary electric machine can be accurately aligned with the shaft center of the engine, and the like. Further, by bringing the annular member into contact with the end surface on the opposite side of the flange portion from the rotor side, the distance in the axial direction between the annular member and the annular wall portion, that is, a disposition space of the clutch can be sufficiently ensured, and the friction engagement plates of the number in accordance with a torque capacity required for the clutch can be disposed. As a result, in the hybrid drive device of the present disclosure, it is possible to sufficiently ensure the torque capacity of the clutch that couples the engine and the rotary electric machine while accurately aligning the rotor of the rotary electric machine with respect to the shaft centers of the engine and the transmission.

Further, the clutch (K0) may include a piston (67) disposed between the annular wall portion (44, 46) and the annular member (50) in the axial direction, and the annular wall portion (46) of the rotor support member (40) and the piston (67) may define an oil chamber (69a) to which a hydraulic pressure for engaging the clutch (K0) is supplied. As a result, since a torque transmitting function and a pressure receiving function when engaging the clutch are gathered on the tubular support portion and the annular wall portion sides, the rigidity required for the annular member can be reduced so as to reduce the cost.

Moreover, the annular member (50) may be fastened to the flange portion (43) via a plurality of bolts (43b). That is, since the annular member does not transmit torque when the clutch is engaged, the annular member does not need to be coupled to the flange portion via splines, etc., and may be coupled to the flange portion by a relatively small number of bolts so that the annular member rotates integrally with the rotor.

Further, the annular wall portion (46, 47) of the rotor support member (40) may be coupled to the second transmitting shaft (142).

Moreover, the rotor (30) may include a rotor core (31) that has an annular shape and that is fixed by shrink fitting or press fitting to an outer peripheral portion of the tubular support portion (42) of the rotor support member (40), and the clutch (K0) may include a clutch hub (61) that is disposed between the annular wall portion (44, 46) and the annular member (50) of the rotor support portion (40) in the axial direction and that is fixed to the first transmitting shaft (141), a first friction engagement plate (64) that is fitted to an outer peripheral portion (61s) of the clutch hub (61), and a second friction engagement plate (63) and a backing plate (65) that are fitted to an inner peripheral portion (42s) of the tubular support portion (42), an annular recess portion (42a) to which a snap ring (66) for restricting the backing plate (65) from moving in the axial direction is fitted may be formed on an inner peripheral surface of the tubular support portion (42), and the annular recess portion (42a) may overlap with at least a part of the flange portion (43) in the axial direction when viewed in a radial direction of the rotor (30). As a result, it is possible to suppress the stress acting on the tubular support portion from the rotor core from being concentrated in the annular recess portion, and satisfactorily ensure the durability of the rotor support member. Then, in the hybrid drive device of the present disclosure, since the annular member is coupled to the flange portion in a state in which the annular member is in contact with the end surface on the opposite side of the flange portion from the rotor side, the annular recess portion can be formed in the tubular support portion so as to overlap with at least a part of the flange portion.

In addition, the annular recess portion (42a) may overlap with an end surface on the rotor (30) side of the flange portion (43) when viewed in the radial direction of the rotor (30).

Further, the case (8) may include an end wall portion (88) that is extended so as to face the annular member (50) of the rotor support member (40) on the engine (11) side, the end wall portion (88) includes a first tubular portion (881) that protrudes in the axial direction from an inner periphery toward the annular member (50), and a second tubular portion (882) that protrudes in the axial direction toward the annular member (50) so as to surround the first tubular portion (881), the annular member (50) may include a tubular portion (51) that protrudes in the axial direction from an inner periphery toward the end wall portion (88), a radial bearing (Br1) may be disposed between the first transmitting shaft (141) and an inner peripheral surface of the first tubular portion (881) of the end wall portion (88), a clearance (a) may be formed between an outer peripheral surface of the first tubular portion (881) of the end wall portion (88) and an inner peripheral surface of the tubular portion (51) of the annular member (50), and the bearing (Brf) that supports the annular member (50) in the radial direction may be disposed between an outer peripheral surface of the tubular portion (51) of the annular member (50) and an inner peripheral surface of the second tubular portion (882) of the end wall portion (88).

In such a hybrid drive device, even if deflection of the first transmitting shaft with respect to the shaft center occurs in accordance with the rotation of the engine, since the clearance is formed between the outer peripheral surface of the first tubular portion and the inner peripheral surface of the tubular portion of the annular member, the deflection of the first transmitting shaft does not affect the tubular portion of the annular member. Thus, in the hybrid drive device of the present disclosure, the rotor support member can be properly supported by the case via the outer side radial bearing. Further, since the first transmitting shaft is supported in the radial direction by the end wall portion of the case via the inner side radial bearing, a torque fluctuation vibration (vibration) of the engine transmitted to the first transmitting shaft is no longer directly transmitted to the outer side radial bearing. As a result, in the hybrid drive device of the present disclosure, the load acting on the outer side radial bearing for supporting the rotor support member, that is, the rotor of the rotary electric machine in the radial direction can be decreased, the durability thereof can be further improved, and the outer side radial bearing can be decreased in size (the cost can be decreased).

Moreover, the case (8) may include a housing (80) having a wall portion (82) in which one end in an axial direction is open and the other end in the axial direction is closed, and a cover (88) that is fixed to the housing (80) so as to cover the one end and that forms the end wall portion, and the wall portion (82) of the housing (80) may hold the bearing (Brr) that supports the annular wall portion (44, 46, 48) of the rotor support member (40) in the radial direction.

Further, it is understood that the disclosure of the present disclosure is not limited to the embodiments described above, and various modifications can be made within the scope of the extension of the present disclosure. Furthermore, the embodiment described above is merely one specific form of the disclosure described in the SUMMARY OF THE DISCLOSURE, and does not limit the elements of the disclosure described in the SUMMARY OF THE DISCLOSURE.

INDUSTRIAL APPLICABILITY

The present disclosure can be used in the manufacturing industry of hybrid drive devices and the like.

The invention claimed is:

1. A hybrid drive device including a rotary electric machine having a stator and a rotor, a transmission coupled to the rotary electric machine, a clutch that couples an engine and the rotary electric machine and that releases a connection of the two, and a case for housing the rotary electric machine and the clutch, the hybrid drive device comprising:

a first transmitting shaft coupled to an output shaft of the engine;

a second transmitting shaft that transmits power from the rotor of the rotary electric machine to the transmission; and a rotor support member that supports the rotor of the rotary electric machine, wherein the rotor support member includes a tubular support portion in which the rotor is fixed to an outer peripheral portion and in which a friction engagement plate of the clutch is fitted in an inner peripheral portion, a flange portion that has an annular shape and that is extended radially outward from one end of the tubular support portion in an axial direction, an annular wall portion that is extended radially inward from the other end side of the tubular support portion in the axial direction, and an annular member that is coupled to the flange portion so as to face the annular wall portion at a distance in the axial direction and rotate integrally with the rotor, the annular wall portion and the annular member of the rotor support member are each supported in a radial direction by the case via a bearing, the annular member is coupled to the flange portion at a position where the flange portion radially overlaps the rotor and in a state of being in contact with an end surface on an opposite side of the flange portion from the rotor side, and the flange portion includes a protruding portion that protrudes in the axial direction from an outer peripheral portion of the end surface to an opposite side from the rotor side and that supports an outer peripheral surface of the annular member in the radial direction.

2. The hybrid drive device according to claim 1, wherein the clutch includes a piston disposed between the annular wall portion and the annular member in the axial direction, and the annular wall portion of the rotor support member and the piston define an oil chamber to which a hydraulic pressure for engaging the clutch is supplied.

3. The hybrid drive device according to claim 1, wherein the annular member is fastened to the flange portion via a plurality of bolts.

4. The hybrid drive device according to claim 3, wherein the annular wall portion of the rotor support member is coupled to the second transmitting shaft.

5. The hybrid drive device according to claim 4, wherein the rotor includes a rotor core that has an annular shape and that is fixed by shrink fitting or press fitting to an outer peripheral portion of the tubular support portion of the rotor support member, and the clutch includes a clutch hub that is disposed between the annular wall portion and the annular member of the rotor support portion in the axial direction and that is fixed to the first transmitting shaft, a first friction engagement plate that is fitted to an outer peripheral portion of the clutch hub, and a second friction engagement plate and a backing plate that are fitted to an inner peripheral portion of the tubular support portion of the rotor support portion, an annular recess portion to which a snap ring for restricting the backing plate from moving in the axial direction is fitted is formed on an inner peripheral surface of the tubular support portion, and the annular recess portion overlaps with at least a part of the flange portion in the axial direction when viewed in a radial direction of the rotor.

6. The drive device according to claim 5, wherein the annular recess portion overlaps with an end surface on the rotor side of the flange portion when viewed in the radial direction of the rotor.

7. The hybrid drive device according to claim 6, wherein the case includes an end wall portion that is extended so as to face the annular member of the rotor support member on the engine side, the end wall portion includes a first tubular portion that protrudes in the axial direction from an inner periphery toward the annular member, and a second tubular portion that protrudes in the axial direction toward the annular member so as to surround the first tubular portion, the annular member includes a tubular portion that protrudes in the axial direction from an inner periphery toward the end wall portion, a radial bearing is disposed between the first transmitting shaft and an inner peripheral surface of the first tubular portion of the end wall portion, a clearance is formed between an outer peripheral surface of the first tubular portion of the end wall portion and an inner peripheral surface of the tubular portion of the annular member, and the bearing that supports the annular member in the radial direction is disposed between an outer peripheral surface of the tubular portion of the annular member and an inner peripheral surface of the second tubular portion of the end wall portion.

8. The hybrid drive device according to claim 7, wherein the case includes a housing having a wall portion in which one end in an axial direction is open and the other end in the axial direction is closed, and a cover that is fixed to the housing so as to cover the one end and that forms the end wall portion, and the wall portion of the housing holds the bearing that supports the annular wall portion of the rotor support member in the radial direction.

9. The hybrid drive device according to claim 1, wherein the annular member is fastened to the flange portion via a plurality of bolts.

10. The hybrid drive device according to claim 9, wherein the annular wall portion of the rotor support member is coupled to the second transmitting shaft.

11. The hybrid drive device according to claim 10, wherein the rotor includes a rotor core that has an annular shape and that is fixed by shrink fitting or press fitting to an outer peripheral portion of the tubular support portion of the rotor support member, and the clutch includes a clutch hub that is disposed between the annular wall portion and the annular member of the rotor support portion in the axial direction and that is fixed to the first transmitting shaft, a first friction engagement plate that is fitted to an outer peripheral portion of the clutch hub, and a second friction engagement plate and a backing plate that are fitted to an inner peripheral portion of the tubular support portion of the rotor support portion, an annular recess portion to which a snap ring for restricting the backing plate from moving in the axial direction is fitted is formed on an inner peripheral surface of the tubular support portion, and the annular recess portion overlaps with at least a part of the flange portion in the axial direction when viewed in a radial direction of the rotor.

12. The drive device according to claim 11, wherein the annular recess portion overlaps with an end surface on the rotor side of the flange portion when viewed in the radial direction of the rotor.

13. The hybrid drive device according to claim 12, wherein
the case includes an end wall portion that is extended so as to face the annular member of the rotor support member on the engine side,
the end wall portion includes a first tubular portion that protrudes in the axial direction from an inner periphery toward the annular member, and a second tubular portion that protrudes in the axial direction toward the annular member so as to surround the first tubular portion,
the annular member includes a tubular portion that protrudes in the axial direction from an inner periphery toward the end wall portion,
a radial bearing is disposed between the first transmitting shaft and an inner peripheral surface of the first tubular portion of the end wall portion,
a clearance is formed between an outer peripheral surface of the first tubular portion of the end wall portion and an inner peripheral surface of the tubular portion of the annular member, and
the bearing that supports the annular member in the radial direction is disposed between an outer peripheral surface of the tubular portion of the annular member and an inner peripheral surface of the second tubular portion of the end wall portion.

14. The hybrid drive device according to claim 13, wherein
the case includes a housing having a wall portion in which one end in an axial direction is open and the other end in the axial direction is closed, and a cover that is fixed to the housing so as to cover the one end and that forms the end wall portion, and
the wall portion of the housing holds the bearing that supports the annular wall portion of the rotor support member in the radial direction.

15. The hybrid drive device according to claim 1, wherein the annular wall portion of the rotor support member is coupled to the second transmitting shaft.

16. The hybrid drive device according to claim 1, wherein
the rotor includes a rotor core that has an annular shape and that is fixed by shrink fitting or press fitting to an outer peripheral portion of the tubular support portion of the rotor support member, and
the clutch includes a clutch hub that is disposed between the annular wall portion and the annular member of the rotor support portion in the axial direction and that is fixed to the first transmitting shaft, a first friction engagement plate that is fitted to an outer peripheral portion of the clutch hub, and a second friction engagement plate and a backing plate that are fitted to an inner peripheral portion of the tubular support portion of the rotor support portion,
an annular recess portion to which a snap ring for restricting the backing plate from moving in the axial direction is fitted is formed on an inner peripheral surface of the tubular support portion, and
the annular recess portion overlaps with at least a part of the flange portion in the axial direction when viewed in a radial direction of the rotor.

17. The hybrid drive device according to claim 16, wherein
the case includes an end wall portion that is extended so as to face the annular member of the rotor support member on the engine side,
the end wall portion includes a first tubular portion that protrudes in the axial direction from an inner periphery toward the annular member, and a second tubular portion that protrudes in the axial direction toward the annular member so as to surround the first tubular portion,
the annular member includes a tubular portion that protrudes in the axial direction from an inner periphery toward the end wall portion,
a radial bearing is disposed between the first transmitting shaft and an inner peripheral surface of the first tubular portion of the end wall portion,
a clearance is formed between an outer peripheral surface of the first tubular portion of the end wall portion and an inner peripheral surface of the tubular portion of the annular member, and
the bearing that supports the annular member in the radial direction is disposed between an outer peripheral surface of the tubular portion of the annular member and an inner peripheral surface of the second tubular portion of the end wall portion.

18. The hybrid drive device according to claim 1, wherein
the case includes an end wall portion that is extended so as to face the annular member of the rotor support member on the engine side,
the end wall portion includes a first tubular portion that protrudes in the axial direction from an inner periphery toward the annular member, and a second tubular portion that protrudes in the axial direction toward the annular member so as to surround the first tubular portion,
the annular member includes a tubular portion that protrudes in the axial direction from an inner periphery toward the end wall portion,
a radial bearing is disposed between the first transmitting shaft and an inner peripheral surface of the first tubular portion of the end wall portion,
a clearance is formed between an outer peripheral surface of the first tubular portion of the end wall portion and an inner peripheral surface of the tubular portion of the annular member, and
the bearing that supports the annular member in the radial direction is disposed between an outer peripheral surface of the tubular portion of the annular member and an inner peripheral surface of the second tubular portion of the end wall portion.

* * * * *